(12) United States Patent
Matsumoto et al.

(10) Patent No.: US 8,802,247 B2
(45) Date of Patent: Aug. 12, 2014

(54) PERPENDICULAR MAGNETIC RECORDING MEDIUM WITH HIGH MEDIUM S/N

(75) Inventors: Hiroyuki Matsumoto, Kanagawa-ken (JP); Mitsuhiro Shoda, Kanagawa (JP); Reiko Arai, Kanagawa (JP); Yuzuru Hosoe, Tokyo (JP); Katsumi Mabuchi, Ibaraki (JP)

(73) Assignee: HGST Netherlands B.V., Amsterdam (NL)

( * ) Notice: Subject to any disclaimer, the term of this patent is extended or adjusted under 35 U.S.C. 154(b) by 312 days.

(21) Appl. No.: 11/582,878

(22) Filed: Oct. 17, 2006

(65) Prior Publication Data

US 2007/0087226 A1 Apr. 19, 2007

(30) Foreign Application Priority Data

Oct. 17, 2005 (JP) ................................. 2005-302221

(51) Int. Cl.
*G11B 5/66* (2006.01)
*G11B 5/667* (2006.01)

(52) U.S. Cl.
CPC ..................................... *G11B 5/667* (2013.01)
USPC ......................... 428/828.1; 428/829; 428/830

(58) Field of Classification Search
USPC .............................................. 428/800–848.9
See application file for complete search history.

(56) References Cited

U.S. PATENT DOCUMENTS

| | | | |
|---|---|---|---|
| 6,942,936 B2 | 9/2005 | Oikawa et al. | |
| 7,166,375 B2 | 1/2007 | Shimizu et al. | |
| 2002/0008016 A1* | 1/2002 | Hayashi et al. | 204/192.1 |
| 2002/0028356 A1* | 3/2002 | Kawato et al. | 428/694 TM |
| 2002/0028357 A1* | 3/2002 | Shukh et al. | 428/694 TM |
| 2004/0009375 A1* | 1/2004 | Tanahashi et al. | 428/695 |
| 2004/0033390 A1* | 2/2004 | Oikawa et al. | 428/694 MM |
| 2004/0219329 A1 | 11/2004 | Oikawa et al. | |
| 2004/0234818 A1 | 11/2004 | Tanahashi et al. | |
| 2005/0069734 A1* | 3/2005 | Okuyama et al. | 428/694 TS |
| 2006/0177702 A1* | 8/2006 | Ajan | 428/828.1 |
| 2007/0111035 A1* | 5/2007 | Shimizu et al. | 428/828.1 |

FOREIGN PATENT DOCUMENTS

| | | |
|---|---|---|
| JP | 06-103553 | 4/1994 |
| JP | 2004-272957 A | 9/2004 |
| JP | 2004-327006 | 11/2004 |

* cited by examiner

*Primary Examiner* — Kevin M. Bernatz
*Assistant Examiner* — Linda Chau
(74) *Attorney, Agent, or Firm* — Zilka-Kotab, PC (57) ABSTRACT

A medium having high medium S/N and excellent corrosion resistance is achieved. In one embodiment, an adhesion layer, a soft magnetic layer, an intermediate layer, a magnetic recording layer, and a protective layer are deposited, in order, on a substrate. The soft magnetic underlayer consists at least of two soft magnetic layers, the first soft magnetic layer formed on the recording layer side being composed of an amorphous alloy containing 85 at. % or less of Co, and the second soft magnetic layer formed on the substrate side being composed of an alloy containing more than 85 at. % of Co.

13 Claims, 8 Drawing Sheets

(thickness of 1st soft magnetic layer)

PERPENDICULAR MAGNETIC RECORDING MEDIUM WITH HIGH MEDIUM S/N

CROSS-REFERENCES TO RELATED APPLICATIONS

This application claims priority from Japanese Patent Application No. JP2005-302221, filed Oct. 17, 2005, the entire disclosure of which is incorporated herein by reference.

BACKGROUND OF THE INVENTION

The present invention relates to a magnetic recording medium which is available for high density information recording and specifically to a magnetic recording medium suitable for high density magnetic recording.

Recently, in compact high capacity magnetic disk drives which are installed in both personal computers and home electric appliance there has been a strong demand to increase the capacity of the magnetic recording/reproducing apparatus and to improve the recording density. In order to respond to this demand, magnetic heads and magnetic recording media are being developed aggressively. However, it has become difficult to improve the recording density by using a longitudinal magnetic recording method which is the current commercial practice. Perpendicular magnetic recording has been studied as a method which will substitute longitudinal magnetic recording. Perpendicular magnetic recording has a stable high recording density state because adjacent magnetizations do not face each other. Moreover, the recording efficiency can be improved by combining a single pole type write head and a double-layered perpendicular recording medium having a soft magnetic underlayer, which allows for dealing with an increase in the coercivity of the recording layer.

In a perpendicular recording method, in order to partake in returning the recorded magnetic flux from a magnetic head, a soft magnetic underlayer basically has to be made of a relatively thick soft magnetic material having a high saturation flux density (Bs). Therefore, noise caused by the soft magnetic underlayer becomes a problem, and the improvements which have been proposed up to now deal essentially with the layer structure of the soft magnetic underlayer in order to decrease this noise and to improve the magnetic recording characteristics.

For instance, JP-A No. 103553/1994 proposes a method in which the soft magnetic underlayer consists of a triple-layered structure with a first soft magnetic layer, a non-magnetic layer, and a second soft magnetic layer, and the noise generated by the magnetic wall motion of the soft magnetic layer is inhibited by exchange coupling with the antiferromagnetic layer in which the direction of the magnetic spin is aligned. Moreover, JP-A No. 79058/2004 proposes a method to decrease the medium noise by oxidizing the surface of the soft magnetic underlayer, forming a soft magnetic underlayer consisting of a first soft magnetic layer, an intermediate layer, and a second soft magnetic layer thereon, and promoting the refinement of the magnetic particles of the perpendicular magnetic recording layer. Although different compositions containing Co are described for the first and second soft magnetic materials, they are for improving the orientation of the perpendicular magnetic recording layer and there is no mention about other characteristics. Moreover, in JP-A No. 327006/2004, a method for decreasing the medium noise is proposed by forming a first underlayer, a second underlayer, and an intermediate layer on the soft magnetic underlayer. Further, although materials having different Co compositions are described for the first underlayer, it is also a method for improving the magnetic characteristics of the perpendicular magnetic recording layer.

BRIEF SUMMARY OF THE INVENTION

As mentioned above, studies of the soft magnetic underlayer of a perpendicular magnetic recording medium have been carried out for the purpose of proposing a perpendicular magnetic recording medium suitable for high recording density, and sufficient studies have not been carried out looking at corrosion resistance and scratch resistance. When the corrosion resistance and scratch resistance tests were performed using a composite assembly of a Co-based soft magnetic underlayer, a Ru intermediate layer, and an oxide granular type perpendicular magnetic recording layer which is well known as a perpendicular magnetic recording medium having a high medium S/N, it was discovered that the scratch strength was weak, a lot of pit corrosion was observed, and problems with corrosion resistance also surfaced.

The present invention has come about in consideration of the aforementioned problems, and more concretely, it is a feature to achieve a medium having a high medium S/N, excellent corrosion resistance and scratch resistance by selecting a combination of materials and structures for the soft magnetic underlayer.

In accordance with an aspect of the present invention, in a perpendicular magnetic recording medium in which a soft magnetic layer, a seed layer, an intermediate layer, a magnetic recording layer, and a protective layer are laminated, in order, on a substrate, the soft magnetic underlayer consists of at least two soft magnetic layers, with a material having excellent corrosion resistance being used for the soft magnetic layer formed on the side of the recording layer, concretely, an amorphous alloy containing 85 at. % or more of Co or an amorphous alloy composed of at least one element selected from Co, Ni, and Fe containing 15 at. % or more of a non-magnetic addition element, and with a material having high saturation flux density Bs and excellent magnetic characteristics being used for the soft magnetic layer formed on the side of the substrate, concretely, an alloy containing more than 85 at. % of Co or an alloy composed of at least one element selected from Co, Ni, and Fe containing 15 at. % or less of a non-magnetic addition element.

The layer where corrosion most becomes a problem in a perpendicular magnetic recording medium is a soft magnetic underlayer using a Co alloy. A Co alloy does not only lack excellent corrosion resistance, but it also causes galvanic corrosion with the adjoining intermediate layer because it has an extremely negative potential in an aqueous solution environment. Since Ru or a Ru alloy which is well known as an intermediate layer is a noble metal, they have an extremely high potential and, since the potential difference between them reaches about 1.0 V, corrosion of a Co alloy is accelerated by galvanic corrosion much more greatly than corrosion of a simple substance. Moreover, because there are many defects in an oxide granular type perpendicular magnetic recording layer which is well known as a recording layer, a protection effect cannot be obtained to carry out the corrosion inhibition of the soft magnetic underlayer although Ru or a Ru alloy has excellent corrosion resistance.

From these viewpoints, the methods to inhibit corrosion of the soft magnetic layer are listed as follows:
(1) forming a stable oxide by adding to the soft magnetic layer a metal which becomes passivated easily in an aqueous solution, (2) increasing the potential in an aqueous solution by reducing the Co content, and decreasing the potential difference with respect to the intermediate layer, (3) fabricating a smooth and dense film, (4) improving the adhesion by making the peeling energy with the intermediate layer greater. The corrosion environment is basically aqueous, but there is a possibility of acidification or alkalinization by decomposition of lubricants, mixing in of chloride, etc., so that there is a requirement of corrosion resistance over a wide pH environment.

With regard to (1), the ease of becoming passivated and the stability of oxide can be roughly estimated in each of them by use of the Pourbaix diagram. For instance, Co can be classified, from the neutral to the alkaline region, into an active region (around 0.3 V)—a first passivation region (from around 0.4 to 0.6 V)—a second passivation region (around 0.8 V)—an oxygen evolution region (1.45 V and greater). However, in an acidic region at pH 4 or lower, passivation cannot be observed in the first passivation potential region. Moreover, since the second passivation potential is shifted on the positive side to a potential just before the oxygen generation potential, passivation almost never occurs, and it always becomes an active solution state. A method which involves alloying with a metal, analogous to Cr, which will be passivated in an acidic region, is proposed in order to improve the corrosion resistance. Since Cr forms an oxide in a weakly acidic region of the potential-pH diagram, alloying with Cr makes it possible to improve the corrosion resistance in an acidic region. Therefore, with an increase in the concentration of the passivation metal to be alloyed (concomitant decrease in the Co concentration), the corrosion is reduced. Elements for alloying additions include Ti, Zr, Ta, Mo, W, Ni, and Ru, etc. Among these, it is considered that Ti, Zr, and Ta, etc. further improve the corrosion resistance because they have a passivation region over a wide pH region.

With regard to (3), this can be accomplished at least by making the soft magnetic layer formed on the side of recording layer an amorphous structure.

With regard to (4), the interfacial adhesion strength between a typical intermediate layer, a seed layer, and a soft magnetic layer was calculated by using a molecular dynamics simulation. Ru, Ta, and CoTaZr were used for the intermediate layer, the seed layer, and the soft magnetic layer, respectively. In the case when the Co content in the CoTaZr is high, the adhesion strength with Ta or Ru could not reach a high value and the adhesion was not high. However, by decreasing the Co content, the adhesion strength increases and the adhesion becomes high. That is, from the viewpoint of adhesion, a perpendicular magnetic recording medium having high adhesion with the intermediate layer or the seed layer can be made by forming a film containing less Co content on the side of the recording layer.

According to the present invention, a medium having high medium S/N, excellent corrosion resistance as well as excellent scratch resistance can be achieved.

DETAILED DESCRIPTION OF THE INVENTION

As one example of the present invention, a perpendicular magnetic recording medium was fabricated by using a sputtering apparatus manufactured by ANELVA (C3010). This sputtering apparatus consists of ten process chambers and one substrate load/unload chamber, and each chamber is evacuated independently. The exhaust ability of all chambers is controlled to be $6 \times 10^{-6}$ Pa or less.

A perpendicular magnetic recording medium of the present invention is one in which an adhesion layer is formed on a substrate, a soft magnetic underlayer formed on the adhesion layer, an intermediate layer formed on the soft magnetic underlayer, and a perpendicular recording layer formed on the intermediate layer.

Although there is no specific limitation on the material of the adhesion layer, as long as it has excellent adhesion with the substrate and excellent surface smoothness, an alloy containing at least two kinds of metals selected from a group of Ni, Al, Ti, Ta, Cr, Zr, Co, Hf, Si, and B is preferable. More concretely, NiTa, AlTi, AlTa, CrTi, CoTi, NiTaZr, NiCrZr, CrTiAl, CrTiTa, CoTiNi, and CoTiAl, etc. can be used.

The soft magnetic underlayer consists of a structure where at least two soft magnetic layers are laminated. It is preferable that a material having excellent corrosion resistance be used for the soft magnetic layer formed on the side of the recording layer and a material having a high saturation flux density Bs and excellent magnetic characteristics be used for the soft magnetic layer formed on the side of the substrate. Both have uniaxial magnetic anisotropy in the radial direction of the disk shaped substrate, and the coercivity measured in the direction of head motion is preferably 0.8 kA/m or less. Concretely, the aforementioned characteristics can be easily obtained when an alloy with an addition of Ta, Hf, Nb, Zr, Si, B, and Cr, etc. is used for the alloy composed of at least one element selected from Co, Ni, and Fe. According to an analysis done by the inventors, it is preferable that the soft magnetic layer formed on the side of the recording layer contain 60 at. % or more and 85 at. % or less of Co or consist of an amorphous alloy composed of at least one element selected from Co, Ni, and Fe containing 15 at. % or more and 40 at. % or less of a non-magnetic addition, and that the film thickness thereof be 15 nm. Moreover, the soft magnetic layer formed on the side of the substrate preferably contains more than 85 at. % of Co or an alloy composed of at least one element selected from Co, Ni, and Fe containing 15 at. % or less of a non-magnetic addition. High medium S/N and excellent corrosion resistance can coexist by combining two different soft magnetic layers.

In order to further decrease noise from the soft magnetic underlayer, it may be possible to insert a non-magnetic layer in the soft magnetic underlayer with the upper and lower soft magnetic layers being coupled through this non-magnetic layer. In this case, it is desirable that the soft magnetic layer formed on the upper side of the non-magnetic layer be a laminated structure having at least two or more layers, a material having excellent corrosion resistance be used for the soft magnetic layer formed on the side of the recording layer, and a material having high saturation flux density Bs be used for the soft magnetic layer formed on the side of the substrate (non-magnetic layer side). Moreover, it is also possible that the soft magnetic layer formed on the lower side of the non-magnetic layer consist of a laminated structure having two or more layers. However, in both cases, it is preferable that the magnetic moments of the soft magnetic layer located on the upper side of the non-magnetic layer and the soft magnetic layer located on the lower side of it be made equal because flux returns between both layers and the magnetic domain conditions of both layers are stabilized. According to the analysis done by the inventors, it is preferable for maintaining a high medium S/N that the ratio of both magnetic moments of both of the soft magnetic layers be controlled to be from 0.9 to 1.1. Ru, Cr, or Cu is preferable as a material to be used in the non-magnetic layer.

It is preferable to apply a cooling process in magnetic field in order to impart with certainty a uniaxial magnetic anisotropy to the soft magnetic underlayer. The magnetic field is preferably applied in the radial direction of the substrate, and it is necessary that the magnetization in the radial direction of the soft magnetic layer be saturated, and the magnitude of the magnetic field on the disk shaped substrate may be at least 4 kA/m or more. It is desirable that the cooling temperature be decreased ideally to room temperature, but considering a reduction in the medium formation process time, it is realistic to decrease it to about 60 to 100° C. Moreover, the point where the cooling process is introduced depends on the medium formation process and is not necessary to be after the formation of the soft magnetic layer, so that it may be after formation of the intermediate layer or the recording layer.

Ru, an alloy mainly composed of Ru having a hexagonal close-packed structure and a face-center cubic structure, or an alloy having a granular structure can be used for the intermediate layer. Moreover, the intermediate layer may consist of a monolayer film and a laminated film using materials having different crystalline structures. Furthermore, in order to improve the crystallographic orientation of the intermediate layer, a crystallographically oriented layer may be formed on the soft magnetic underlayer.

An alloy which is mainly composed of CoCrPt and in which an oxide is added to have a granular structure can be used for the perpendicular recording layer. Concretely, $CoCrPt-SiO_2$, $CoCrPt-MgO$, and $CoCrPt-TaO$, etc. can be used. Moreover, a super-lattice film such as a (Co/Pd) multilayer film, a (CoB/Pd) multilayer film, a (Co/Pt) multilayer film, and a (CoB/Pt) multilayer film, etc. can be used.

It is preferable that a film mainly composed of carbon with a thickness of 2 nm or more and 8 nm or less be formed as a protective film of the perpendicular recording layer, and, moreover, a lubricant layer composed of perfluoroalkylpolyether or the like be used. As a result, a perpendicular recording medium with high reliability can be obtained.

A glass substrate, an Al alloy substrate on which a NiP plated film is coated, a ceramic substrate, and a substrate on which a concentric circular shaped valley is formed at the surface by texture processing can be used for the substrate.

The read/write characteristics were evaluated by a spin-stand. The head used for the evaluation is a composite magnetic head consisting of a read element using giant magnetoresistance with a shield gap length of 55 nm and a track width of 120 nm and a single domain write element with a track width of 170 nm. The output and noise were measured under the condition of a relative velocity between the head and the medium of 10 m/s, a skew angle of 0 degree, and a magnetic spacing of about 15 nm, and the medium S/N was obtained as the ratio of an isolated waveform when the signal with a linear recording density of 1970 fr/mm was recorded and the integrated noise when a signal with a linear recording density of 23620 fr/mm was recorded.

The evaluation of the corrosion resistance was carried out according to the following procedure. First, a sample is left for 96 hours under the conditions of a state of high temperature and high humidity which is a temperature of 60° C. and a relative humidity of 90% RH. Next, the number of pit corrosion with a radius in the region from 14 mm to 25 mm was counted using an Optical Surface Analyzer and ranked as follows. Those with a number count less than 50 were rated as A, those with 50 or more and less than 200 as B, those with 200 or more and less than 500 as C, and those with 500 or more as D. A rank B or higher is preferable in practice.

The scratch test was carried out by forced-vibration of a 5 μm R diamond needle using a ceramic actuator and moving it at a speed of 30 μm/sec with the stage being inclined 5 degrees. The load increases gradually by moving the stage sideways, resulting in the sample being broken. The larger this breaking load is means the stronger is the scratch resistance.

Hereinafter, concrete embodiments to which the present invention is applied will be explained referring to the following drawings.

Embodiment 1

Figure 1:
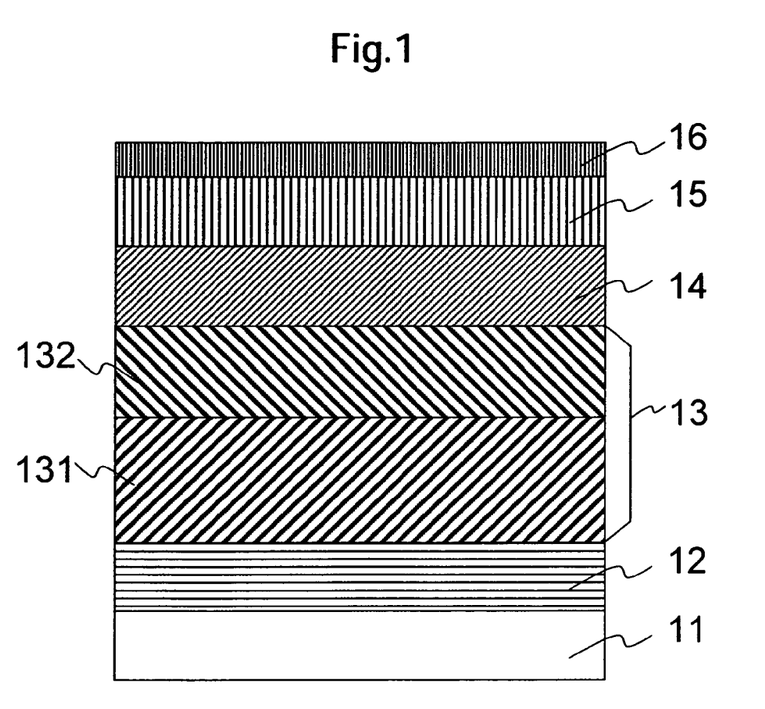
FIG. 1 is a drawing illustrating a structure of a perpendicular magnetic medium of an embodiment of the present invention.

FIG. 1 is a layer configuration illustrating a perpendicular magnetic recording medium of this embodiment. A glass disk substrate with a thickness of 0.635 mm and a diameter of 65 mm (2.5 inch type) was used for the substrate 11 and an adhesion layer 12, a second soft magnetic layer 131, a first soft magnetic layer 132, an intermediate layer 14, a perpendicular recording layer 15, and a protective layer 16 were formed, in order, by using a sputtering technique. The soft magnetic layers 131 and 132 form a soft magnetic underlayer 13. The composition of each layer, the Ar gas pressure, and the film thickness used in this embodiment are shown in Table 1.

TABLE 1

|  | | Composition (at. %) | Ar-gas pressure (Pa) | Rate (nm/s) | Thickness (nm) |
|---|---|---|---|---|---|
| Adhesion layer 12 | | $Ni_{62.5}Ta_{37.5}$ | 1 | 5 | 30 |
| Soft magnetic underlayer 13 | 2nd soft magnetic layer 131 | $Co_{92}Ta_3Zr_5$ | 0.5 | 12.5 | 50–100 |
|  | 1st soft magnetic layer 132 | $Co_{80}Ta_{10}Zr_{10}$ | 0.5 | 12.5 | 0–50 |
| Intermediate layer 14 | | Ru | 2 | 0.3 | 20 |
| Recording layer 15 | | $CoCr_{13}Pt_{14}$—$SiO_2$ | 2 | 1 | 16 |
| Protective layer 16 | | Carbon | 0.6 | 1 | 5 |

First, 30 nm thick NiTa to be the adhesion layer is formed on the substrate 11, and thereon were formed, in order, 75 nm thick 92Co-3Ta-5Zr (at. %) to be the second soft magnetic layer 131, and 25 nm thick 80Co-10Ta-10Zr (at. %) to be the first soft magnetic layer 132. Moreover, 20 nm Ru to be the intermediate layer 14, 16 nm thick CoCrPt—$SiO_2$ to be the recording layer 15, and 5 nm thick carbon to be the protective layer 16 were formed. Then, a lubricant in which a perfluoroalkylpolyether based material is diluted by fluoro carbon is coated and the surface burnished, resulting in a perpendicular recording medium of this embodiment being fabricated. Ar was used for the sputtering gas, and oxygen was added at a partial pressure of 20 mPa when the magnetic recording layer was formed. When the protective layer 16 was formed, nitrogen was added at a partial pressure of 50 mPa into an Ar pressure of 0.6 Pa during deposition. Herein, both the 92Co-3Ta-5Zr (at. %) and the 80Co-10Ta-10Zr (at. %) were amorphous alloy.

As a comparison, a medium (1-2) in which the soft magnetic underlayer 13 consists of only the second soft magnetic layer 131 and a medium (1-3) in which it consists of only the first soft magnetic layer 132 were prepared. The film thicknesses of both of these soft magnetic layers were controlled to be 100 nm. Moreover, a medium (1-4) in which 80Co-10Ta-10Zr (at. %) was formed on the adhesion layer 12 and 92Co-3Ta-5Zr (at. %) formed thereon, and a medium (1-5) in which 92Co-3Ta-5Zr (at. %) was formed on the adhesion layer 12 and a crystalline alloy of 60Co-40Ni (at. %) formed thereon were prepared. See Table 2. The film thicknesses of the soft magnetic layers of the medium 1-4 and the medium 1-5 were controlled to be 75 nm for the second soft magnetic layer 131 on the side of substrate and 25 nm for the first soft magnetic layer 132 on the side of recording layer. Other layer configurations are the same as this embodiment.

TABLE 2

|  | Sample | 2nd soft magnetic layer 131 $Co_{92}Ta_3Zr_5$ | 1st soft magnetic layer 132 $Co_{80}Ta_{10}Zr_{10}$ |
|---|---|---|---|
| This invention | 1-1 | | |
| Reference | 1-2 | | x |
|  | 1-3 | x | |
|  | 1-4 | $Co_{80}Ta_{10}Zr_{10}$ | $Co_{92}Ta_3Zr_5$ |
|  | 1-5 | $Co_{92}Ta_3Zr_5$ | $Co_{60}Ni_{40}$ |

Table 3 shows the results of corrosion resistance rank and the medium S/N of the medium 1-1 of this embodiment and of the media 1-2 to 1-5 of the comparative examples.

First, when we turn our attention to the results of the corrosion resistance, the medium 1-1 of this embodiment in which a material having less Co content is used for the first soft magnetic layer 132 on the side of the recording layer and the medium 1-3 in which the soft magnetic underlayer consists of only the first soft magnetic layer 132 have relatively excellent corrosion resistance. Other than that, bad results at rank C or lower were obtained. Although an improvement in the corrosion resistance was observed by using a material having less Co content, even if a material having less Co content is formed on the side of the substrate as shown in the medium 1-4 of the comparative example and a material having less Co content is formed on the side of the recording layer as shown in the medium 1-5 of the comparative example, it is understood that the effect is small in the case when it is a crystalline material. That is, it is understood that it is necessary to form an amorphous material having less Co content on the side of the recording layer in order to improve the corrosion resistance.

Next, we turn our attention to the medium S/N. A high medium S/N could be obtained in the medium 1-1 of this embodiment and in the medium 1-2 in which the soft magnetic underlayer consists of only the second soft magnetic underlayer 131. On the other hand, both the medium 1-3 in which the soft magnetic underlayer consists of only the first soft magnetic layer 132 and the medium 1-4 in which a material having less Co content was formed on the side of the substrate side had a low medium S/N compared with the medium 1-1 of this embodiment. When the product of the saturation flux density and the film thickness of the soft magnetic underlayer of each medium was summed, it was about 120 nmT in the medium 1-1, 130 nmT in the medium 1-2, 85 nmT in the medium 1-3, and 97 nmT in the medium 1-4. The total of the product of the saturation flux density and the film thickness in the entire medium having a worse medium S/N was 100 nmT or less, so that it is understood that it is necessary for the total of the product of the saturation flux density and the film thickness of the soft magnetic underlayer to be at least 100 nmT or more in order to maintain a high medium S/N. Moreover, the comparative example 1-5 in which CoNi having a high saturation flux density is used for the first soft magnetic layer 132 also had a low medium S/N. Since CoNi is a crystalline material, the crystallographic orientation of the intermediate layer Ru formed thereon became worse and the crystal grain size became larger. Therefore, it is considered that the performance of the recording layer was deteriorated.

Although it was necessary that the total of the product of the saturation flux density and the film thickness of the soft magnetic underlayer be 100 nmT or more in order to obtain a high medium S/N in this embodiment, this value depends on the characteristics of the recording layer and the dimensions of the head. However, when the writing ability of the recording layer is concerned, it is clearly understood that a certain size is necessary. As mentioned above, in order to obtain excellent corrosion resistance at rank B or higher while maintaining a high medium S/N, it is understood that it is preferable that the soft magnetic underlayer be configured of a double-layered structure, a material having high saturation flux density being used for the second soft magnetic layer 131 on the side of the substrate, and an amorphous material having less Co content being used for the first magnetic layer 132 on the side of the recording layer.

TABLE 3

| | Sample | Corrosion rank | S/N (dB) |
|---|---|---|---|
| This invention | 1-1 | B | 17.1 |
| Reference | 1-2 | D | 17.2 |
| | 1-3 | B | 14.8 |
| | 1-4 | D | 15.9 |
| | 1-5 | C | 15.8 |

In the medium 1-1 of this embodiment, the relationship between the corrosion resistance and the medium S/N was investigated by changing the Co content of the first soft magnetic layer 132. In (a) of FIG. 2 the relationship between the Co content of the first soft magnetic layer 132 and the medium S/N is shown, and in (b) of FIG. 2 the relationship between the Co content of the first soft magnetic layer 132 and the number of pit corrosion is shown. The Co content shown here represents the amount of Co included in each film. A high medium S/N value could be obtained when the Co content was 60 at. % or more, and excellent corrosion resistance at rank B or higher was obtained when the Co content was 85 at. % or less.

Figure 3:
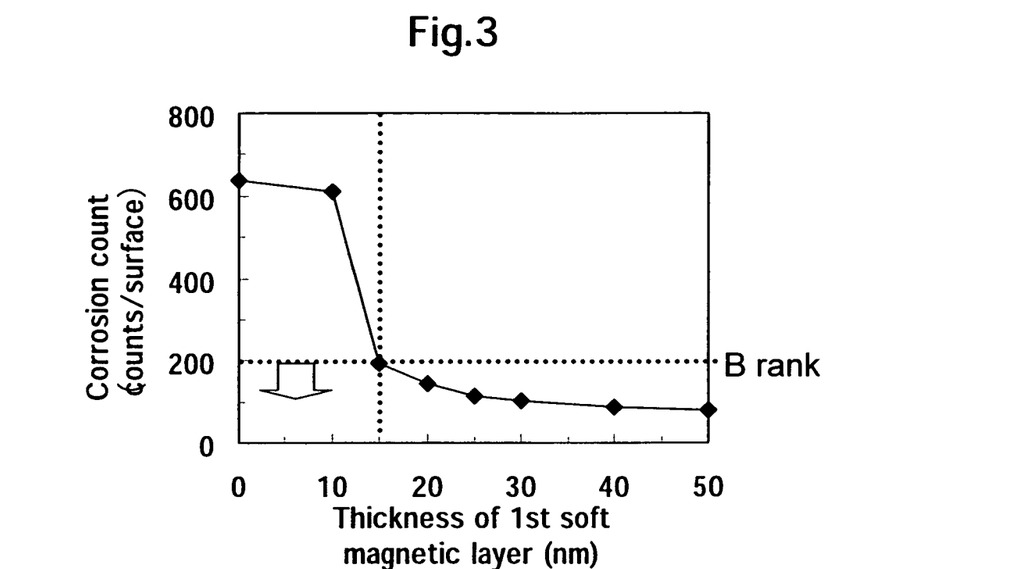
FIG. 3 is a diagram illustrating the relationship between the film thickness of a first soft magnetic layer and the pit corrosion count of a perpendicular magnetic recording medium of the present invention.

Next, in the medium 1-1 of this embodiment, the relationship between the film thickness of the first soft magnetic layer 132 and the corrosion resistance was investigated. The results are shown in FIG. 3. Herein, the total thickness of the soft magnetic underlayer 13 was controlled to be a constant 100 nm. It is understood that excellent corrosion resistance could be obtained when the film thickness of the first soft magnetic layer is controlled to be 15 nm or more.

Figure 4:
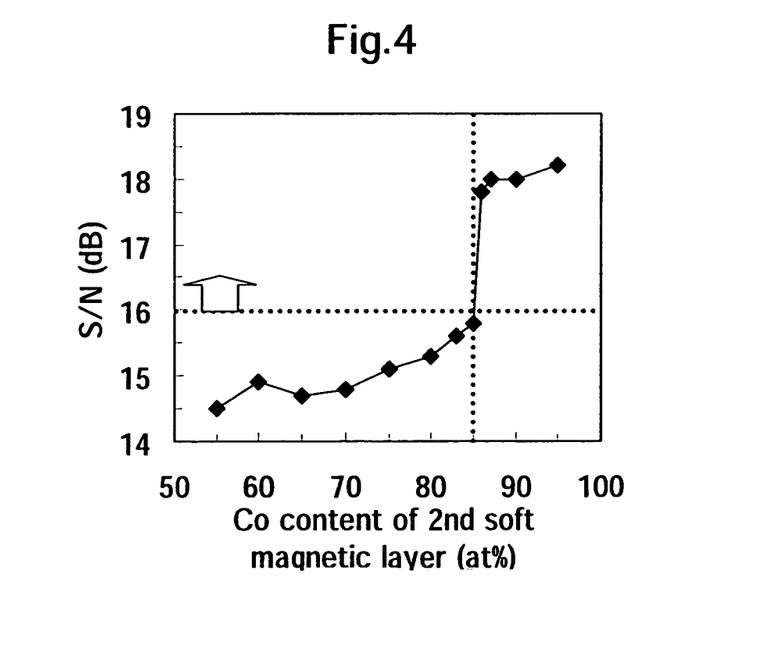
FIG. 4 is a diagram illustrating the relationship between the Co content of a second soft magnetic layer and the medium S/N of a perpendicular magnetic recording medium of the present invention.

Moreover, in the medium 1-1 of this embodiment, the relationship between the Co content of the second soft magnetic layer 131 and the medium S/N was investigated. The results are shown in FIG. 4. A high medium S/N could be obtained when the Co content was more than 85 at. %.

Figure 2:
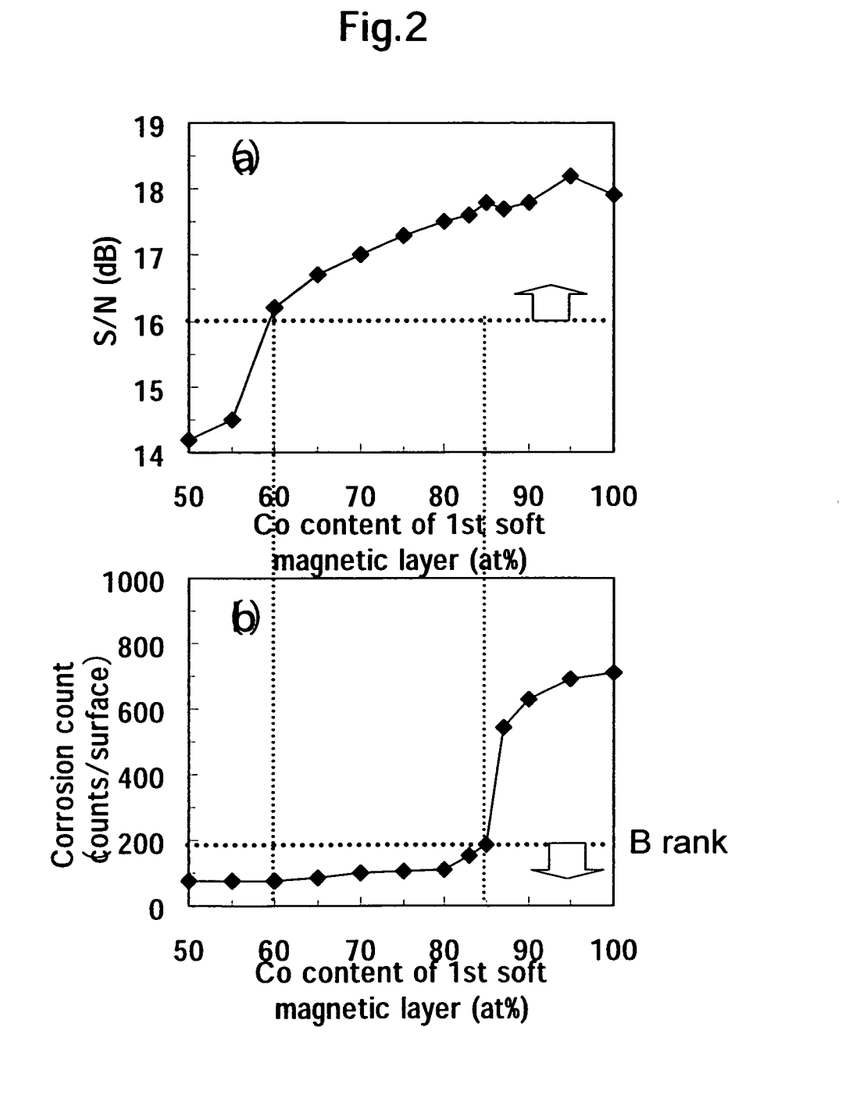
FIG. 2 is a diagram illustrating the relationships between the Co content of a first soft magnetic layer and both the medium S/N and pit corrosion count of a perpendicular magnetic recording medium of the present invention.

Accordingly, in order to achieve a high medium S/N and excellent corrosion resistance, it is understood that it is preferable that the Co content of the first soft magnetic layer 132 be controlled to be 60 at. % or more and 85 at. % or less, the film thickness 15 nm or more, and the Co content of the second soft magnetic layer 131 more than 85 at. %.

Embodiment 2

A medium which had the same layer configuration as the medium 1-1 of the embodiment 1 and had a different second soft magnetic layer 131 and first soft magnetic layer 132 was fabricated, and the corrosion resistance and read/write characteristics were evaluated by using the same means as the embodiment 1. The composition, the film thickness, and the deposition process of each layer, except for the soft magnetic underlayer 13, were the same as the medium 1-1 of the embodiment 1. The results are shown in Table 4.

In the media from 2-1 to 2-7, the second soft magnetic layer 131 was fixed to be 92Co-3Ta-5Zr (at. %) and the material of the first soft magnetic layer 132 was changed. In the media from 2-1 to 2-4, Hf, Si, or Cr was added instead of Ta and Zr in the CoTaZr alloy. Moreover, in the media from 2-5 to 2-7, Ni or Fe was added in lieu of Co. Excellent corrosion resistance at rank B or higher could be obtained in each medium. Specifically, as shown in media 2-3 and 2-4, it is understood that the most effective addition for corrosion resistance was Cr.

In the media from 2-8 to 2-11, the first soft magnetic layer 132 was fixed to be 80Co-10Ta-10Zr (at. %) and the material of the second soft magnetic layer 131 was changed. In the medium 2-8, Ta was substituted by Nb, and in the media from 2-9 to 2-11, Ni or Fe was added in lieu of Co. A high medium S/N was obtained in each of these media. That is, even when the Co content is less than 85 at. %, the medium S/N of the second soft magnetic layer 131 is not deteriorated if the content of the non-magnetic addition element is less than 15 at. %. As seen in the embodiment 1, since Bs of the second soft magnetic layer has to be made high to a certain point, Ni or Fe is preferable as a material to be added in lieu of Co.

Comparative examples are shown in the media 2-12 and 2-13. In these media, Ni or Fe was added in lieu of Co in the first soft magnetic layer 132. Although both media have a Co content of 50 at. % or less, the rank of corrosion resistance was C or less. That is, in order to obtain excellent corrosion resistance, it is necessary not only to decrease the Co content, but also to add a non-magnetic addition element (Ta and Zr in the comparative examples) above a certain amount. Then, the relationships between the content of the non-magnetic addition element included in each soft magnetic layer, the medium S/N and the corrosion resistance were investigated in more detail.

Figure 5:
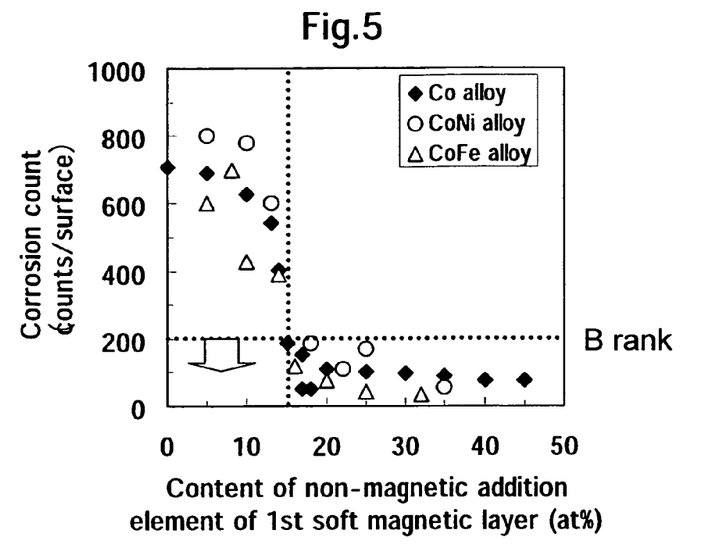
FIG. 5 is a diagram illustrating the relationship between the content of the non-magnetic addition element of a first soft magnetic layer and the pit corrosion count of a perpendicular magnetic recording medium of the present invention.
Figure 6:
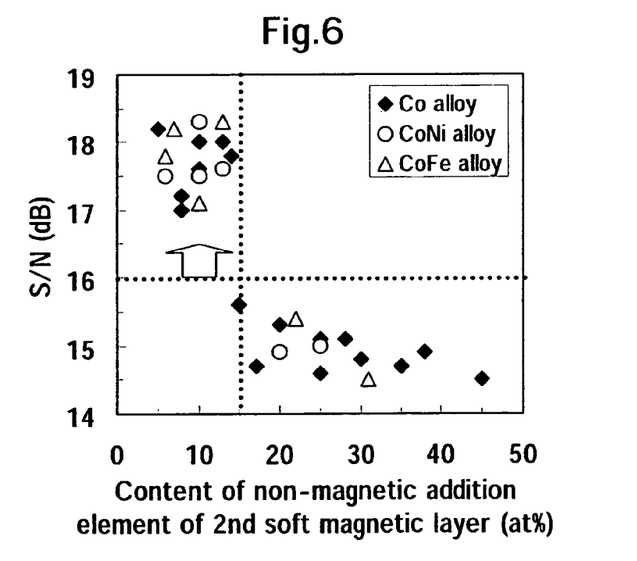
FIG. 6 is a diagram illustrating the relationship between the content of the non-magnetic addition element of a second soft magnetic layer and the medium S/N of a perpendicular magnetic recording medium of the present invention.

FIG. 5 is a diagram of the relationship between the content of non-magnetic addition elements included in the first magnetic layer formed on the side of the recording layer and the corrosion resistance. Herein, the symbols of solid diamond, open circle, and open triangle mean a Co alloy, a CoNi alloy, and a CoFe alloy, respectively. It is understood that excellent corrosion resistance at rank B or higher can be obtained in any of these alloys as long as they contain 15 at. % or more of a non-magnetic element. FIG. 6 shows the relationship between the content of a non-magnetic addition element included in the second soft magnetic layer 131 formed on the side of the substrate and the medium S/N. In this case, independent of the material of the main component, it is understood that a high medium S/N can be obtained by adding less than 15 at. % of a non-magnetic element to either of these alloys.

TABLE 4

| | Sample | 2nd soft magnetic layer 131 | 1st soft magnetic layer 132 | Corrosion rank | S/N (dB) |
|---|---|---|---|---|---|
| | 1.1 | $Co_{92}Ta_3Zr_5$ | $Co_{80}Ta_{10}Zr_{10}$ | B | 17.1 |
| This invention | 2-1 | $Co_{92}Ta_3Zr_5$ | $Co_{82}Ta_5Zr_5Hf_8$ | B | 17.2 |
| | 2-2 | $Co_{92}Ta_3Zr_5$ | $Co_{82}Ta_5Zr_5Si_8$ | B | 17.2 |
| | 2-3 | $Co_{92}Ta_3Zr_5$ | $Co_{82}Ta_5Zr_5Cr_8$ | A | 17.1 |
| | 2-4 | $Co_{92}Ta_3Zr_5$ | $Co_{83}Ta_2Zr_5Cr_{10}$ | A | 17 |
| | 2-5 | $Co_{92}Ta_3Zr_5$ | $Co_{40}Ni_{40}Ta_{10}Zr_{10}$ | B | 17.2 |
| | 2-6 | $Co_{92}Ta_3Zr_5$ | $Co_{40}Fe_{30}Ta_{10}Zr_{10}$ | B | 17.2 |
| | 2-7 | $Co_{92}Ta_3Zr_5$ | $Co_{40}Fe_{56}Ta_{10}Zr_{10}$ | B | 17.3 |
| | 2-8 | $Co_{83}Ni_{10}Zr_7$ | $Co_{80}Ta_{10}Zr_{10}$ | B | 17.1 |
| | 2-9 | $Co_{90}Nb_5Zr_5$ | $Co_{80}Ta_{10}Zr_{10}$ | B | 17.1 |

TABLE 4-continued

|  | Sample | 2nd soft magnetic layer 131 | 1st soft magnetic layer 132 | Corrosion rank | S/N (dB) |
|---|---|---|---|---|---|
|  | 2-10 | $Co_{30}Fe_{56}B_{14}$ | $Co_{80}Ta_{10}Zr_{10}$ | B | 17.2 |
|  | 2-11 | $Co_{36}Fe_{52}Ta_5Zr_7$ | $Co_{80}Ta_{10}Zr_{10}$ | B | 17.3 |
| Reference | 2-12 | $Co_{92}Ta_3Zr_5$ | $Co_{45}Ni_{45}Ta_5Zr_5$ | D | 17.3 |
|  | 2-13 | $Co_{92}Ta_3Zr_5$ | $Co_{32}Fe_{58}Ta_5Zr_5$ | C | 17.4 |

Accordingly, it is understood that excellent corrosion resistance can coexist with a high medium S/N when a non-magnetic addition element contained in the soft magnetic layer formed on the side of the recording layer is 15 at. % or more and a non-magnetic addition element contained in the soft magnetic layer formed on the side of the substrate is less than 15 at. %.

Embodiment 3

Figure 7:
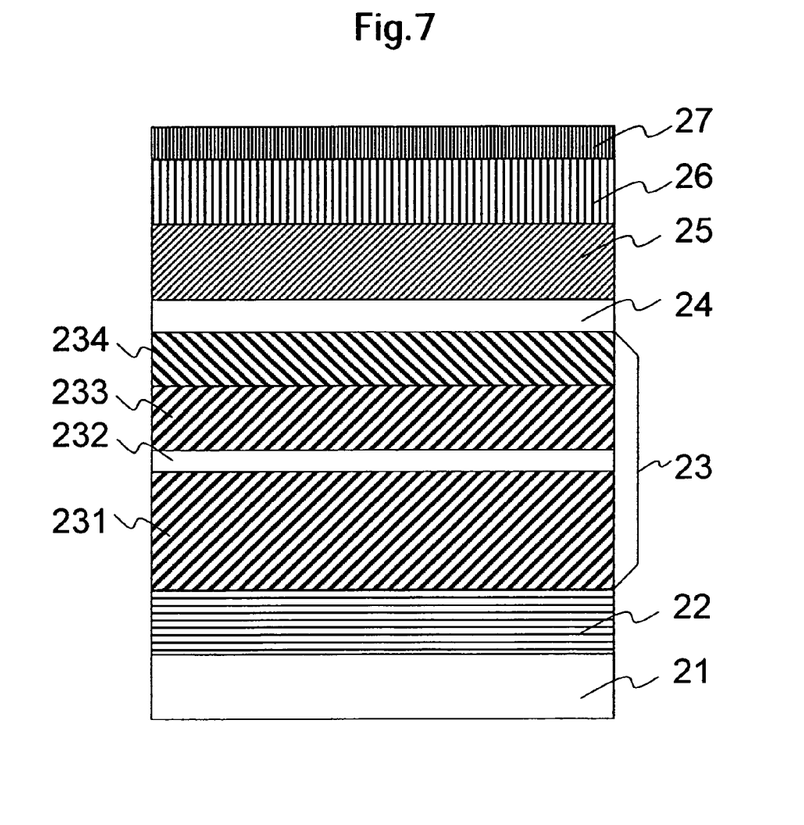
FIG. 7 is a drawing illustrating a structure of a perpendicular magnetic recording medium of an embodiment of the present invention.

FIG. 7 is a layer configuration illustrating a perpendicular magnetic recording medium of this embodiment. A textured glass substrate with a thickness of 0.635 mm and a diameter of 65 mm (2.5 inch type) on which concentric circular shaped valley was formed on the surface was used for a substrate 21, and an adhesion layer 22, a third soft magnetic layer 231, a non-magnetic layer 232, a second soft magnetic layer 233, a first soft magnetic layer 234, a seed layer 24, an intermediate layer 25, a perpendicular recording layer 26, and a protective layer 27 were formed, in order, thereon by using a sputtering technique. Table 5 shows the target and the Ar gas pressure used for the fabrication of each layer and the film thickness.

TABLE 5

|  |  | Composition (at. %) | Ar-gas pressure (Pa) | Rate (nm/s) | Thickness (nm) |
|---|---|---|---|---|---|
| Adhesion layer 22 |  | $Ni_{62.5}Ta_{37.5}$ | 1 | 5 | 30 |
| Soft magnetic underlayer 23 | 3rd soft magnetic layer 231 | $Co_{88}Ni_5Zr_7$ | 0.5 | 12.5 | 50 |
|  | nonmagnetic layer 232 | Ru | 1 | 0.7 | 0.8 |
|  | 2nd soft magnetic layer 233 | $Co_{88}Ni_5Zr_7$ | 0.5 | 12.5 | 4-45 |
|  | 1st soft magnetic layer 234 | $Co_{82}Ta_5Zr_5Cr_8$ | 0.5 | 12.5 | 7-68 |
| Seed layer 24 |  | Ta | 0.5 | 1 | 2 |
| Intermediate layer 25 |  | Ru | 2 | 0.3 | 16 |
| Recording layer 26 |  | $CoCr_{17}Pt_{14}$—$SiO_2$ | 2 | 1 | 16 |
| Protective layer 27 |  | Carbon | 0.6 | 1 | 5 |

First, 30 nm thick NiTa to be the adhesion layer was formed on the substrate 21. Then, 50 nm thick 88Co-5Ta-7Zr (at. %) to be a third soft magnetic layer 231, 0.8 nm thick Ru to be a non-magnetic layer 232, 30 nm thick 88Co-5Ni-7Zr (at. %) to be a second soft magnetic layer 233, and 30 nm thick 82Co-5Ta-5Zr-8Cr (at. %) to be a first soft magnetic layer 234 were formed, in order, thereon and the substrate was cooled down below about 80° C. in a magnetic field. Furthermore, 2 nm thick Ta to be a seed layer 24, 16 nm thick Ru to be an intermediate layer 25, 16 nm thick CoCrPt—$SiO_2$ to be a recording layer 26, and 5 nm thick carbon to be a protective layer 27 were formed. Then, a lubricant in which a perfluoroalkylpolyether based material was diluted by fluorocarbon was coated and the surface was burnished, resulting in the perpendicular recording medium (3-1) of this embodiment being fabricated. Ar is used as the sputtering gas and oxygen was added at a partial pressure of 20 mPa when the magnetic recording layer was deposited. When a protective layer 27 was formed, nitrogen was added at a partial pressure of 50 mPa into an Ar pressure of 0.6 Pa during deposition.

The corrosion resistance and the medium S/N of the medium 3-1 of this embodiment were evaluated, resulting in corrosion resistance greater than rank B and excellent medium S/N greater than 18 dB being obtained.

Figure 8:
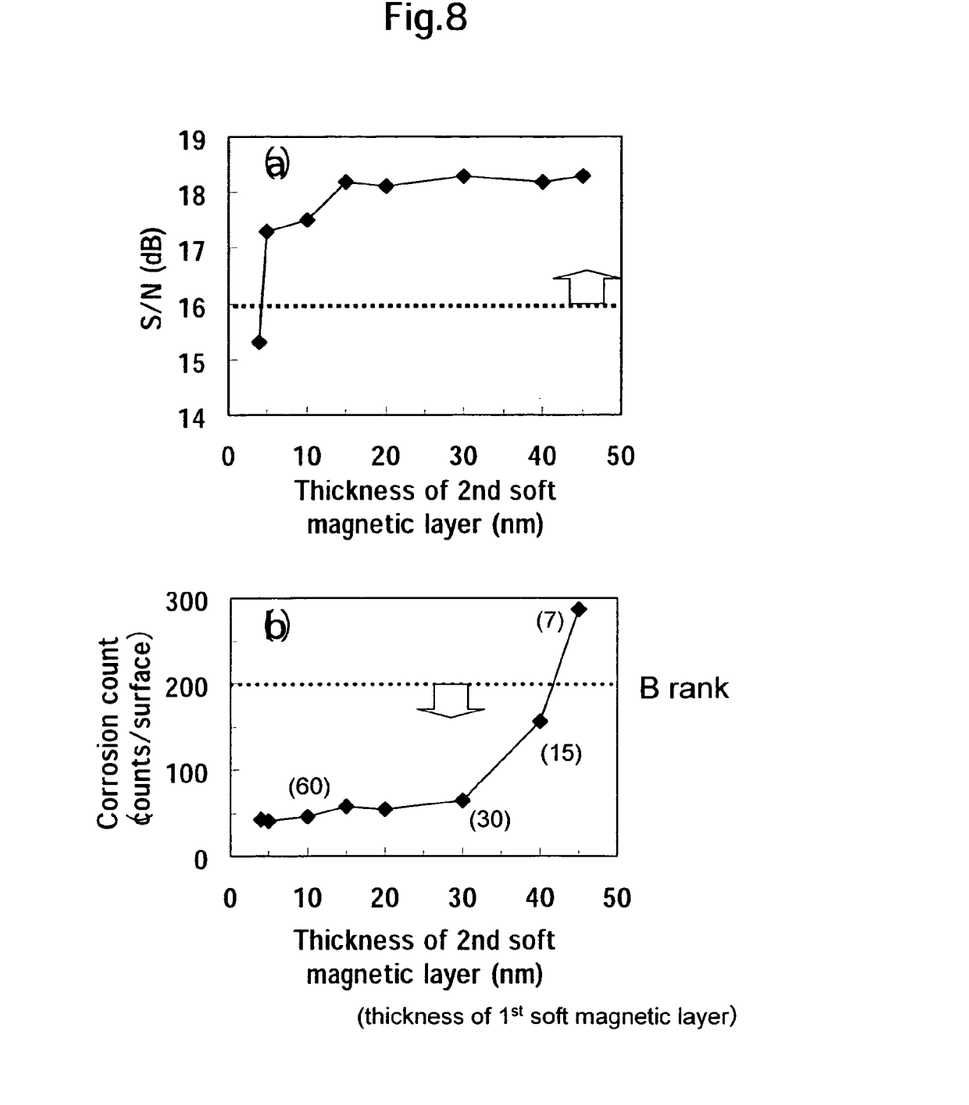
FIG. 8 is a diagram illustrating the relationships between the film thickness of a second soft magnetic layer and both the medium S/N and the pit corrosion count of a perpendicular magnetic recording medium of the present invention.

Next, the relationship between the film thickness and the medium S/N of the second soft magnetic layer was investigated. Herein, the film thickness of the third soft magnetic layer 231 was fixed at 50 nm. The film thickness of the first soft magnetic layer 234 is determined such that the magnetic moment of the third soft magnetic layer 231 (product of the film thickness t3 and the saturation flux density Bs3:t3×Bs3) is equal to sum of the magnetic moment of the second soft magnetic layer 233 (product of the film thickness t2 and the saturation flux density Bs2:t2×Bs2) and the magnetic moment of the first soft magnetic layer 234 (product of the film thickness t1 and the saturation flux density Bs1:t1×Bs1).

The results are shown in (a) of FIG. 8. It is understood that an excellent medium S/N was obtained when the film thickness of the second magnetic layer 233 was 5 nm or more. The result of the corrosion resistance is shown in (b) of FIG. 8. The film thickness of the first magnetic layer 234 is shown in parentheses, ( ), in the figure. Excellent corrosion resistance greater than rank B was obtained in the case of the film thickness of the first magnetic layer 234 being 15 nm or more. According to the aforementioned results, it is understood that the film thicknesses of the second soft magnetic layer 233 and the first soft magnetic layer 234 are preferably 5 nm or more and 15 nm or more, respectively, in order for medium S/N to coexist with corrosion resistance.

Figure 9:
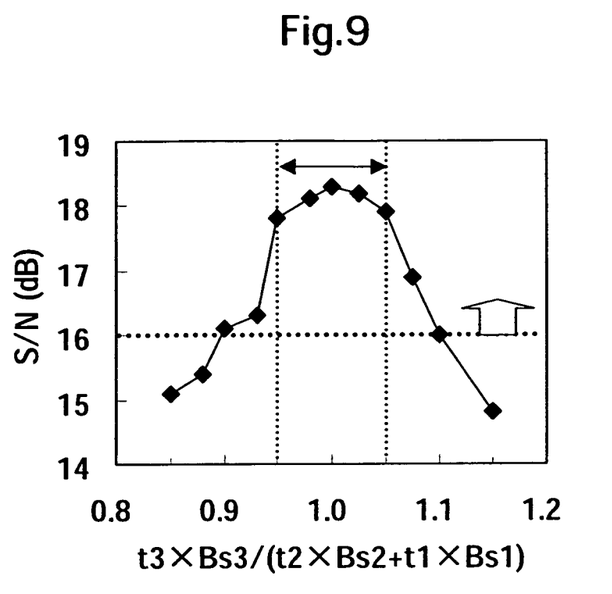
FIG. 9 is a diagram illustrating the relationship between the ratio of the magnetic moment of a soft magnetic underlayer and the medium S/N of a perpendicular magnetic recording medium of the present invention.

The relationship between the magnetic moment of the soft magnetic layer (product of the film thickness and the saturation flux density: t×Bs) and the medium S/N was investigated. Herein, the thickness of the third soft magnetic layer 231 was fixed at 50 nm and the sum of the film thicknesses of the second soft magnetic layer 233 and the first soft magnetic layer 234 at 60 nm, and the thickness of the second soft magnetic layer 233 was varied from 5 nm to 55 nm. The results are shown in FIG. 9. The greater the ratio of the magnetic moment of the third soft magnetic layer 231 to the sum of the magnetic moments of the second soft magnetic layer 233 and the first soft magnetic layer 234, the smaller is the medium S/N. In order to obtain an excellent medium S/N, it is preferable that the ratio be in the range from 0.95 to 1.05. When the corrosion resistance of the medium where an excellent medium S/N was obtained was investigated, excellent corrosion resistance greater than rank B could be obtained in both samples.

Embodiment 4

Figure 10:
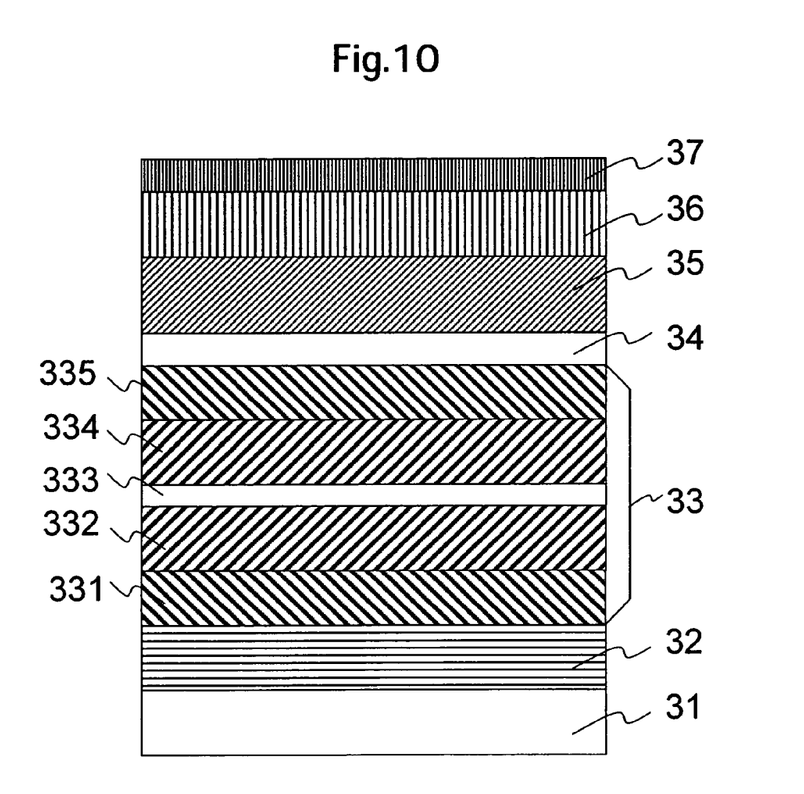
FIG. 10 is a drawing illustrating a structure of a perpendicular magnetic recording medium of an embodiment of the present invention.

FIG. 10 is a layer configuration illustrating a perpendicular magnetic recording medium of this embodiment. A textured glass substrate with a thickness of 0.635 mm and a diameter of 65 mm (2.5 inch type) on which a concentric circular shaped valley was formed on the surface was used for a substrate 31, and an adhesion layer 32, a fourth soft magnetic layer 331, a third soft magnetic layer 332, a non-magnetic layer 333, a second soft magnetic layer 334, a first soft magnetic layer 335, a seed layer 34, an intermediate layer 35, a perpendicular recording layer 36, and a protective layer 37 were formed, in order, thereon by using a sputtering technique. The composition, the film thickness, and the fabrication method of each layer were the same as the medium 3-1 of the embodiment 3 except for the soft magnetic underlayer.

When the medium 4-1 was formed, in which 10 nm thick 80Co-5Ta-5Zr-10Cr (at. %) was used for the first and fourth soft magnetic layers and 40 nm thick 90Co-5Ta-5Zr (at. %) was used for the second and third soft magnetic layers, and the corrosion resistance and the medium S/N were evaluated, corrosion resistance of rank A and excellent medium S/N greater than 18 dB could be obtained.

Embodiment 5

Media were fabricated which had the same layer configuration as the medium 4-1 of the embodiment 4 and had different recording layers, and the read/write characteristics and corrosion resistance were evaluated by using same techniques as in the embodiment 1. The composition, the film thickness, and the deposition process of each layer except for the recording layer, were the same as the medium 4-1 of the embodiment 4. The medium 5-1 consists of a recording layer having a granular structure in which Ta oxide was added to the CoCrPt, and the recording layers of the media 5-2 and 5-3 were composed of multilayer films of Co/Pd and Co/Pt, respectively. The corrosion resistance of both media was as excellent as rank A, and the read/write characteristics of the medium 5-1 was the most excellent compared with the media 5-2 and 5-3. Thus, although excellent read/write characteristics can be obtained in the soft magnetic underlayer of the present invention even if a Co/Pd or Co/Pt multilayer film is used for the recording layer, it is understood that the most excellent effect can be obtained in a recording layer having a granular structure in which an oxide is added to a CoCrPt system.

TABLE 6

| Sample | Recording layer (thickness: nm) | Corrosion rank | S/N (dB) |
| --- | --- | --- | --- |
| 5-1 | CoCrPt—TaO(16) | A | 18.4 |
| 5-2 | [Co/Pd]$_{20}$(16) | A | 17.2 |
| 5-3 | [CoPt]$_{20}$(16) | A | 17.5 |

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A perpendicular magnetic recording medium comprising:
a soft magnetic underlayer, an intermediate layer, a magnetic recording layer, and a protective layer which are laminated, in order, on a substrate,
wherein said soft magnetic underlayer has an upper soft magnetic layer having a first soft magnetic layer, and a second soft magnetic layer below and in direct contact with the first soft magnetic layer,
wherein said soft magnetic underlayer has a lower soft magnetic layer having a third soft magnetic layer, and a fourth soft magnetic layer disposed below and directly adjacent said third magnetic layer,
wherein said soft magnetic underlayer has a non-magnetic layer formed between said upper soft magnetic layer and said lower soft magnetic layer,
wherein said second soft magnetic layer and said third soft magnetic layer are antiferromagnetically coupled to each other,
said first soft magnetic layer being composed of an amorphous alloy containing 85 at. % or less of Co and 15 at. % or more of a non-magnetic material; and
said second and third soft magnetic layers being composed of an alloy containing more than 85 at. % of Co and 15 at.% or less of a non-magnetic material,
wherein said first and fourth soft magnetic layers are each Co—Ta—Zr—Cr,
wherein said second and third soft magnetic layers are Co—Ta—Zr,
wherein a ratio of magnetic moments of the upper and lower soft magnetic layers are about equal
wherein the thickness of said first soft magnetic layer is 15 nm or more,
wherein the thickness of said second soft magnetic layer is 5 nm or more.

2. The perpendicular magnetic recording medium according to claim 1, wherein said upper and lower soft magnetic layers have uniaxial magnetic anisotropy in a radial direction of the medium.

3. The perpendicular magnetic recording medium according to claim 2, wherein said second soft magnetic layer and said third soft magnetic layer are identical in composition and thickness.

4. The perpendicular magnetic recording medium according to claim 3, wherein said second and third soft magnetic layers are each 10 nm thick.

5. The perpendicular magnetic recording medium according to claim 2, wherein said second soft magnetic layer is disposed between said first soft magnetic layer and said nonmagnetic layer, and said first soft magnetic layer and said fourth soft magnetic layer are identical in composition and thickness.

6. The perpendicular magnetic recording medium according to claim 5, wherein said first and fourth soft magnetic layers are each 40 nm thick.

7. The perpendicular magnetic recording medium according to claim 1, wherein said first soft magnetic layer contains only Co and-the non-magnetic material.

8. The perpendicular magnetic recording medium according to claim 1, wherein said second soft magnetic layer and said third soft magnetic layer are identical in composition.

9. A perpendicular magnetic recording medium comprising:
   a soft magnetic underlayer, an intermediate layer, a magnetic recording layer, and a protective layer which are laminated, in order, on a substrate,
   wherein said soft magnetic underlayer has an upper soft magnetic layer having a first soft magnetic layer, and a second soft magnetic layer below and in direct contact with the first soft magnetic layer,
   wherein said soft magnetic underlayer has a lower soft magnetic layer having a third soft magnetic layer and a fourth soft magnetic layer disposed below and directly adjacent said third magnetic layer,
   wherein said soft magnetic layer has a non-magnetic layer formed between said upper soft magnetic layer and said lower soft magnetic layer,
   wherein said second soft magnetic layer and said third soft magnetic layer are antiferromagnetically coupled to each other,
   said first soft magnetic layer being composed of an amorphous alloy containing between 60 at. % and 85 at. % of Co and between 15 at. % and 40 at. % of a non-magnetic material and
   said second and third soft magnetic layers being composed of an alloy containing 85 at. % or more of Co and 15 at. % or less of a non-magnetic material,
   wherein said first and fourth soft magnetic layers are each Co—Ta—Zr—Cr,
   wherein said second and third soft magnetic layers are 90Co-5Ta-5Zr (at.%),
   wherein a ratio of nonmagnetic moments of the upper and lower soft magnetic layers are about equal;
   wherein the thickness of said first soft magnetic layer is 15 nm or more,
   wherein the thickness of said second soft magnetic layer is 5 nm or more.

10. The perpendicular magnetic recording medium according to claim 7,
    wherein said second and third soft magnetic layers are each 10 nm thick,
    wherein said first and fourth soft magnetic layers are each 40 nm thick.

11. The perpendicular magnetic recording medium according to claim 7, wherein said first soft magnetic layer contains only Co and-the non-magnetic material.

12. The perpendicular magnetic recording medium according to claim 7, wherein said second and third soft magnetic layers are each 10 nm thick.

13. The perpendicular magnetic recording medium according to claim 10, wherein said upper and lower soft magnetic layers have uniaxial magnetic anisotropy in a radial direction of the medium.

* * * * *